March 4, 1924.
I. H. CUPPS
UNIVERSAL JOINT
Filed Jan. 19, 1923
1,486,076
2 Sheets-Sheet 1
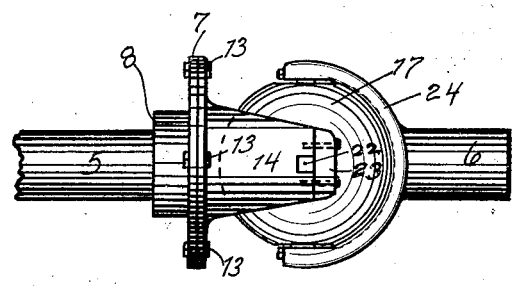
Fig. I.
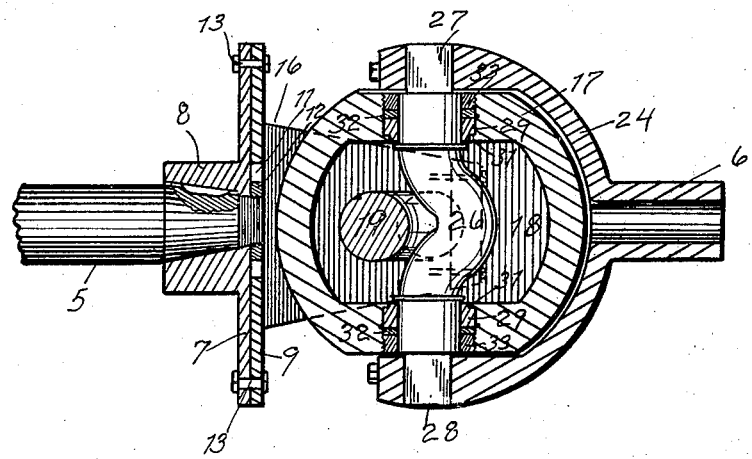
Fig. II.
INVENTOR
IRSLE H CUPPS
ATTORNEY March 4, 1924.
I. H. CUPPS
1,486,076
UNIVERSAL JOINT
Filed Jan. 19, 1923
2 Sheets-Sheet 2
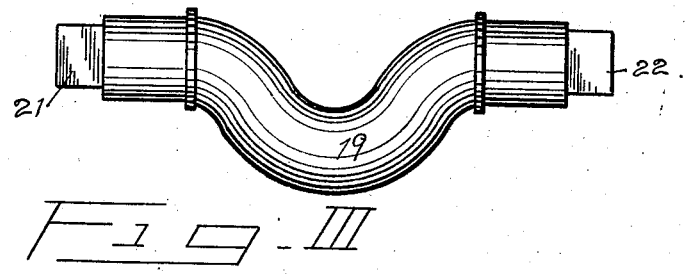
Fig. III
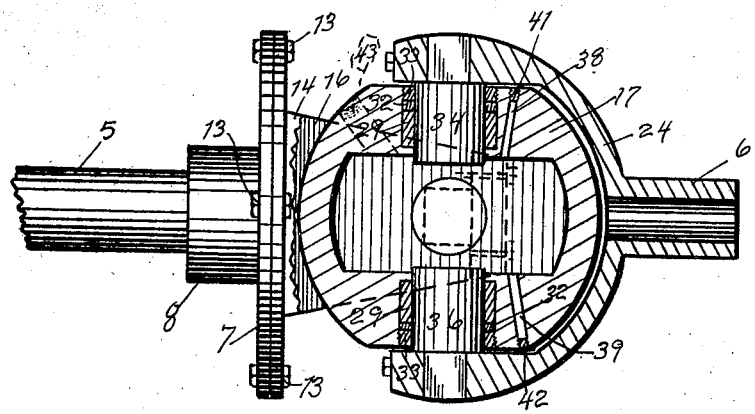
Fig. IV
INVENTOR
IRSLE H. CUPPS
Victor J. Evans
ATTORNEY Patented Mar. 4, 1924.

1,486,076

UNITED STATES PATENT OFFICE.

IRSLE H. CUPPS, OF SAN FRANCISCO, CALIFORNIA.

UNIVERSAL JOINT.

Application filed January 19, 1923. Serial No. 613,740.

*To all whom it may concern:*

Be it known that I, IRSLE H. CUPPS, a citizen of the United States, residing at San Francisco, in the county of San Francisco and State of California, have invented new and useful Improvements in Universal Joints, of which the following is a specification.

This invention relates to improvements in universal joints and has particular reference to a universal joint wherein it is desirous of transmitting power.

The principal object of my invention is to provide a universal joint which will be self-lubricating and one in which the lubrication cannot be thrown out during the movement of the joint.

A still further object is to provide a device of this character which is simple in construction, cheap to manufacture and yet one which is well within the limits of safety.

A still further object is to provide a device of this character wherein the working parts are entirely protected against dirt which would tend to destroy the utility of the device.

Other objects and advantages will be apparent during the course of the following description.

In the accompanying drawings forming a part of this specification, and in which like numerals are employed to designate like parts throughout the same, Figure 1 is a side elevation of a universal joint constructed in accordance with my invention, Figure 2 is an enlarged detail cross section shown partly in elevation of my invention, Figure 3 is a detail view of one of the cross pieces, and Figure 4 is a modified form of my device.

Heretofore as far as applicant is aware of universal joints have been of such a construction that it was very difficult to properly lubricate the same, as owing to their construction, the lubrication would be thrown away from the joint due to centrifugal action.

I have sought to overcome this difficulty by enclosing the working parts within a ball, filling the ball with a lubricant and providing stuffing boxes so that the lubricant cannot easily work out past the moving parts.

In the accompanying drawings wherein for the purpose of illustration is shown a preferred embodiment of my invention, the numeral 5 designates the power shaft, and the numeral 6 the telescoping end of a propeller shaft.

A plate 7 is secured to the end of the power shaft in the usual manner as by a splined collar 8. At 9 I have shown a disc provided with a central bore 11, through which a reduced portion of the power shaft extends and is adapted to have a nut 12 screwed thereon.

The plate 9 is further held to the plate 7 as by bolts 13. The plate 9 has integrally formed therewith side pieces as shown at 14 and 16. These side pieces are adapted to straddle a ball 17, thus forming a yoke. This ball is provided with a chamber 18, the purpose of which will be later seen.

The numeral 19 refers to an offset shaft the form of which is best shown in Figure 3. This shaft is provided with squared ends as shown at 21 and 22 and is adapted to pass through the ball 17 and have its squared ends held in the side plates 14 and 16.

Bearing caps 23 serve to maintain these squared ends in their proper position relative to the side plates. At 24 I have shown a yoke positioned at right angles to the side plates 14 and 16 and also straddling the ball 17.

A shaft 26 having squared ends 27 and 28 extends between the opposite arms of the yoke 24 and passes through the ball 17. At the four points where the shafts 19 and 26 extend through the ball 17, I provide suitable bearings (see Fig. 2) wherein the numeral 29 refers to a bushing positioned against an annular flange 31.

At 32 I have shown a packing and at 33 a packing nut which functions in the usual manner. By now referring to Figure 4 it will be noted that the construction is identical with that shown in Figure 2, with the exception that the offset shafts are omitted and stub shafts as shown at 34, 36 and 37 are employed, the balance of the structure being identical, thus producing a joint of much smaller dimension than is possible where the offset shaft is employed.

By referring to Figure 4, it will be noted that I have shown openings at 38 and 39 which are closed by screw threaded caps 41 and 42, respectively. The purpose of these openings is to permit a tool to be inserted in order to drive out the bushings 29.

I have also shown in dotted lines an orifice 42 through which grease may be inserted, for the purpose of filling the chamber 18. It is of course understood that this orifice is closed by a screw threaded cap. Like orifices are formed in the ball shown in Figure 2, but have been omitted from this figure to simplify the drawing.

It will thus be seen that I have provided a very simple universal joint which may be filled with grease and which will lubricate itself from the interior. Owing to the use of packing glands it will be impossible for this grease to work out to a sufficient extent to endanger the operation of the joint.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, a power shaft, a disc secured to said power shaft and having outwardly extending side pieces, a ball positioned between said side pieces, a yoke straddling said ball, the medial line of the arms of said yoke being removed 90° from the medial line of said side pieces, shafts extending between the opposite ends of said yoke and the opposite ends of said side pieces, and offsets formed in said shafts, substantially as and for the purpose specified.

2. In a device of the character described, a hollow ball, a shaft extending through said ball, said shaft having an offset central portion, a second shaft extending through said ball at right angles to said first mentioned shaft, a yoke straddling said ball and having its ends rigidly secured to the opposite ends of one of said shafts, a second yoke comprising a plate having outwardly extending side pieces, said side pieces being rigidly secured to the ends of said second mentioned shaft and means for rotating said plate, substantially as and for the purpose specified.

3. In a device of the character described, a ball, a chamber formed in said ball, shafts extending through said ball, the protruding ends of said shafts being in radial alignment and being removed 90° from each other, a bushing surrounding said shafts at their point of passage through said ball, a packing positioned against said bushing and a packing nut surrounding said shaft and adapted to be screwed into said ball for the purpose of compressing said packing, yokes positioned 90° with respect to each other and having their opposite ends rigidly secured to the protruding ends of said shafts, substantially as and for the purpose specified.

In testimony whereof I affix my signature.

IRSLE H. CUPPS.